United States Patent
Pursifull (10) Patent No.: US 10,703,351 B2
(45) Date of Patent: Jul. 7, 2020

(54) METHODS AND APPARATUS TO DETECT WARPED ROTORS BASED ON BRAKE PRESSURE

(71) Applicant: Ford Global Technologies, LLC, Dearborn, MI (US)

(72) Inventor: Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/000,631

(22) Filed: Jun. 5, 2018

(65) Prior Publication Data
US 2019/0367002 A1 Dec. 5, 2019

(51) Int. Cl.
| B60T 8/32 | (2006.01) |
| B60T 17/22 | (2006.01) |
| F16D 65/00 | (2006.01) |
| B60T 8/171 | (2006.01) |
| B60T 13/66 | (2006.01) |
| F16D 66/00 | (2006.01) |
| B60T 8/48 | (2006.01) |

(52) U.S. Cl.
CPC .............. *B60T 17/221* (2013.01); *B60T 8/171* (2013.01); *B60T 8/48* (2013.01); *B60T 13/662* (2013.01); *F16D 65/0006* (2013.01); *F16D 2066/005* (2013.01)

(58) Field of Classification Search
CPC ........ B60T 17/18; B60T 17/22; B60T 17/221; B60T 2270/406; B60T 2270/88; B60T 8/171; B60T 8/172
See application file for complete search history.

(56) References Cited

U.S. PATENT DOCUMENTS

| 6,378,669 | B1* | 4/2002 | Kurasako | B60T 8/4081 188/218 XL |
| 7,695,075 | B1* | 4/2010 | Mackiewicz | B60T 17/221 188/18 A |
| 8,000,870 | B2 | 8/2011 | Dessouki et al. | |
| 2001/0049577 | A1* | 12/2001 | Kesselgruber | B60T 8/00 701/70 |
| 2009/0055065 | A1* | 2/2009 | Dessouki | B60T 8/00 701/70 |
| 2016/0245351 | A1* | 8/2016 | Johnson | B60T 8/17 |
| 2017/0113698 | A1* | 4/2017 | Zwegers | G01P 3/488 |

FOREIGN PATENT DOCUMENTS

| DE | 102014225984 | 6/2016 |
| JP | 2004114747 | 4/2004 |
| JP | 2009166688 | 7/2009 |
| JP | 5780060 | 9/2015 |

* cited by examiner

*Primary Examiner* — Nicholas J Lane
(74) *Attorney, Agent, or Firm* — Ray Coppielle; Hanley, Flight & Zimmerman, LLC (57) ABSTRACT

Methods and apparatus are disclosed that detect warped rotors. An example apparatus includes a controller configured to receive a brake pressure and one or more wheel parameters of a vehicle associated with a first braking event, determine a presence of a warped rotor based on a comparison of the brake pressure to a threshold pressure, and identify a wheel of the vehicle associated with the warped rotor based on the brake pressure and the one or more wheel parameters.

14 Claims, 8 Drawing Sheets

METHODS AND APPARATUS TO DETECT WARPED ROTORS BASED ON BRAKE PRESSURE

FIELD OF THE DISCLOSURE

This disclosure relates generally to braking systems and, more particularly, to methods and apparatus to detect warped rotors based on brake pressure.

BACKGROUND

Vehicle brake systems may implement brake rotors (e.g., disc brakes) to provide braking to a vehicle. Typically, braking surfaces of the brake rotors contact or engage brake pads to generate braking forces. As the braking forces are generated, heat is transferred to the brake rotors and, thus, a temperature of the brake rotors increases during braking. In some cases, heat and/or other factors cause brake rotors to warp. To ensure optimal braking performance is provided by the brake rotors, any warped rotor present must be repaired. Leaving the warped rotor untreated can cause decreased brake performance.

The figures are not to scale. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

DETAILED DESCRIPTION

Vehicle brake systems can implement brake rotors (e.g., disc brakes) operatively coupled to wheel assemblies of a vehicle to provide braking to the vehicle via frictional forces. Typically, brake rotors have annular braking surfaces configured to be frictionally engaged by an opposing pair of brake pads. During braking operations, the brake pads are urged (e.g., via a brake caliper) toward a brake rotor to contact and engage the braking surfaces of the rotor, thereby generating braking forces as the brake rotor rotates between the pads. As the braking forces are generated, heat is transferred to the brake rotor at a relatively high rate (i.e., a heating rate) and, thus, a temperature of the brake rotor tends to increase rapidly. After the brake pads disengage the braking surfaces, heat is dissipated or transferred from the brake rotor at a lower rate (i.e., a cooling rate) and the temperature of the brake rotor tends to decrease slowly.

In some instances, a brake rotor can exhibit rotor warp, leading to a reduction in brake performance. As used herein, a warped rotor refers to a brake rotor having one or more braking surfaces that deviate from a plane perpendicular to the rotational axis of the rotor as it rotates. Warped rotors are also described herein as a rotor or rotors having "rotor warp," "rotor runout," "axial runout," and/or "lateral runout." Rotor warp can be caused by several different factors, including, for example, variation in rotor thickness, distortion of the rotor hub and/or braking surfaces, and/or worn or loose wheel bearings.

For example, the heat generated when the brake rotor rotates between the brake pads may eventually wear down less dense areas of the brake rotor at a faster rate than more dense areas of the rotor. The wearing down of areas of the brake rotor leads to a non-uniform brake rotor surface (e.g., an uneven rotor thickness, rotor runout, etc.). In other examples, the rotor thickness variation is caused by brake pad material being removed from the brake pads and deposited on the face of the rotor. The deposits of material cause certain areas of the rotor to become thicker than other areas, resulting in a rotor thickness variation.

In other examples, contamination (e.g., rust or grit build-up) creates an uneven mounting surface that causes the rotor to rotate off of its intended axis. In still other examples, faulty wheel and/or rotor installation leads to a rotor rotating off of its intended axis. When a rotor does not rotate at a right angle in relation to a wheel hub face, a portion or portions of the rotor make contact with the brake pad during every rotation. The side-to-side movement of the rotor as it rotates is a potential source of rotor warp. This contact can also wear down the portion or portions of the rotor, creating a variation in thickness of the rotor. In some additional examples, rotor warp may be caused by worn and/or excessively loose wheel bearings. The worn and/or loose wheel bearings can cause the rotor to "wobble" as it rotates.

When the brakes of the vehicle are applied (e.g., by a driver pushing down a brake pedal) in the presence of a warped rotor, a pedal pulsation is felt by the driver through the brake pedal. The brake pedal pulsations are caused by the brake pads moving in and out (e.g., due to side-to-side movement of the rotor, etc.) throughout the wheel rotation due to the warped rotor. Warped rotors can reduce the efficacy of a braking system, creating less effective braking for the driver of the vehicle. Further, the pressure pulsations caused by warped rotors cause driver discomfort because the pressure pulsations can be felt in the brake pedal and the steering wheel of the vehicle.

Therefore, there is a need to detect warped rotors and alert a driver, original equipment manufacturer (OEM), and/or fleet owner to the issue. Further, identifying the wheel or wheels associated with the warped rotor(s) improves the ease and efficacy of fixing the warped rotor by determining the rotor that must be addressed prior to servicing the vehicle. Moreover, detecting one or more warped rotors reduces diagnostic time and increases diagnostic and/or prognostic accuracy.

Figure 1:
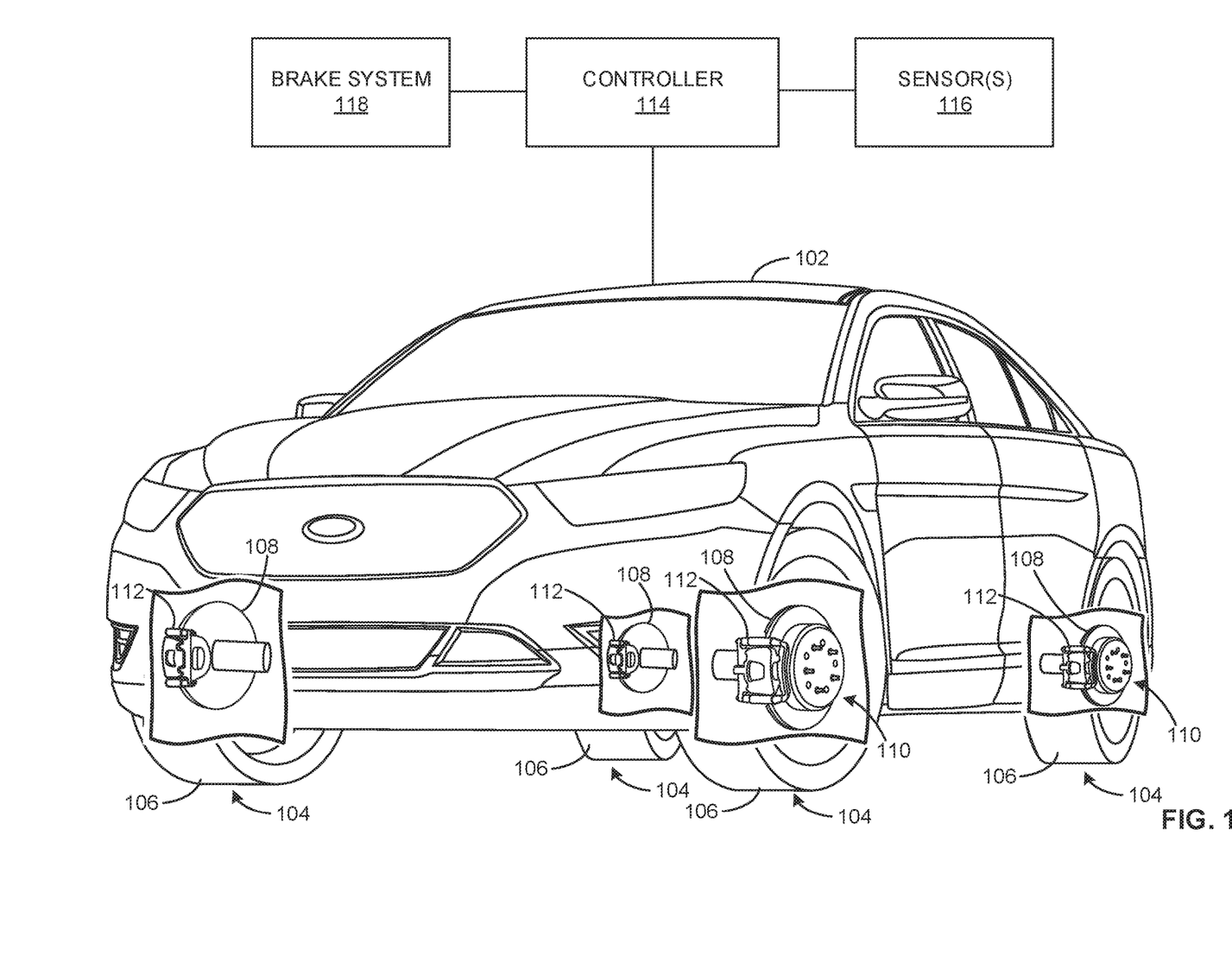
FIG. 1 is a schematic illustration of an example vehicle that may implement the teachings of this disclosure.

FIG. 1 is a schematic illustration of an example vehicle 102 that may implement the teachings of this disclosure. The example vehicle 102 has one or more wheel assemblies 104. The vehicle 102 can be a car, a van, a truck, etc. In the illustrated example of FIG. 1, the vehicle 102 includes four wheel assemblies 104. In other examples, the vehicle 102 can include additional or fewer wheel assemblies 104. In any case, each of the wheel assemblies 104 includes a wheel 106 a respective brake rotor (e.g., a disc brake) 108 coupled to the wheel assemblies 104 via fasteners (e.g., lugs, bolts, nuts, etc.) 110, and/or any other suitable fastening method or technique, such that wheel assemblies 104 and their corresponding brake rotors 108 can rotate in tandem.

In the illustrated example of FIG. 1, the vehicle 102 includes brake calipers 112 coupled to one or more of the wheel assemblies 104 to provide braking to the vehicle 102. For example, during braking operations of the vehicle 102, the brake calipers 112 cause brake pads (not shown) to engage the brake rotors 108 to decelerate the vehicle 102. As the brake calipers 112 cause the brake pads to engage the brake rotors 108, friction and heat are generated between the brake calipers 112 and the brake rotors 108.

In the illustrated example of FIG. 1, the vehicle includes an example controller 114 communicatively coupled to example sensors 116 and an example brake system 118 of the vehicle 102. The controller 114 receives brake pressure data from the brake system 118 (e.g., hydraulic brake line pressure). The brake pressure is the hydraulic force that actuates the braking system when the pedal is depressed. When rotor runout is present in the brake rotors 108, a pressure pulsation or pressure pulsations are present in the brake pressure output by the brake system 118. In some examples, the runout present in the rotors 108 creates two pressure pulsations for each wheel rotation. In some other examples, one pressure pulsation per wheel rotation is present in the brake pressure. In other examples, more pressure pulsations occur for each rotation of the wheel depending on the type of runout associated with the rotor 108. An example of brake pressure for a braking event, including pressure pulsations, is discussed further in connection with FIG. 5. As used herein, a braking event or brake event refers to a duration for which a driver of the vehicle depresses the brake pedal, thus applying the brakes to decelerate the vehicle. In some examples, a braking event is measured for a predetermined amount of rotation of a wheel or wheels 106 of the vehicle 102 (e.g., 360°, 720°, etc.).

The controller 114 further receives inputs from the sensors 116. In some examples, the sensor 116 is a wheel sensor that outputs wheel angle data and/or wheel speed data. In some examples, the sensors 116 are included in a tire pressure monitoring system, such as a tire pressure sensor, an accelerometer (e.g., a g-sensor), etc. Additionally or alternatively, the sensors 116 can be any other sensors included in the vehicle 102.

The example controller 114 uses the inputs received from the sensors 116 and the brake system 118 to determine that rotor runout is present in one or more rotors 108 of the vehicle 102 and, further, to determine the wheel(s) 106 associated with the runout. The controller 114 determines the presence of rotor runout by detecting pressure pulses in the brake pressure received from the brake system 118 that meet a threshold. For example, one or more maximum pressure values of pressure pulses meeting a threshold are determined to indicate rotor runout of one of the rotors 108. Further, the controller 114 uses the inputs received form the sensors 116 to associate the runout with the specific rotor 108 (e.g., a left front rotor, a right rear rotor, etc.). In some examples, an alert is sent to a driver of the vehicle 102 when rotor runout is detected and associated with a wheel or wheels 106 of the vehicle 102.

Figure 2:
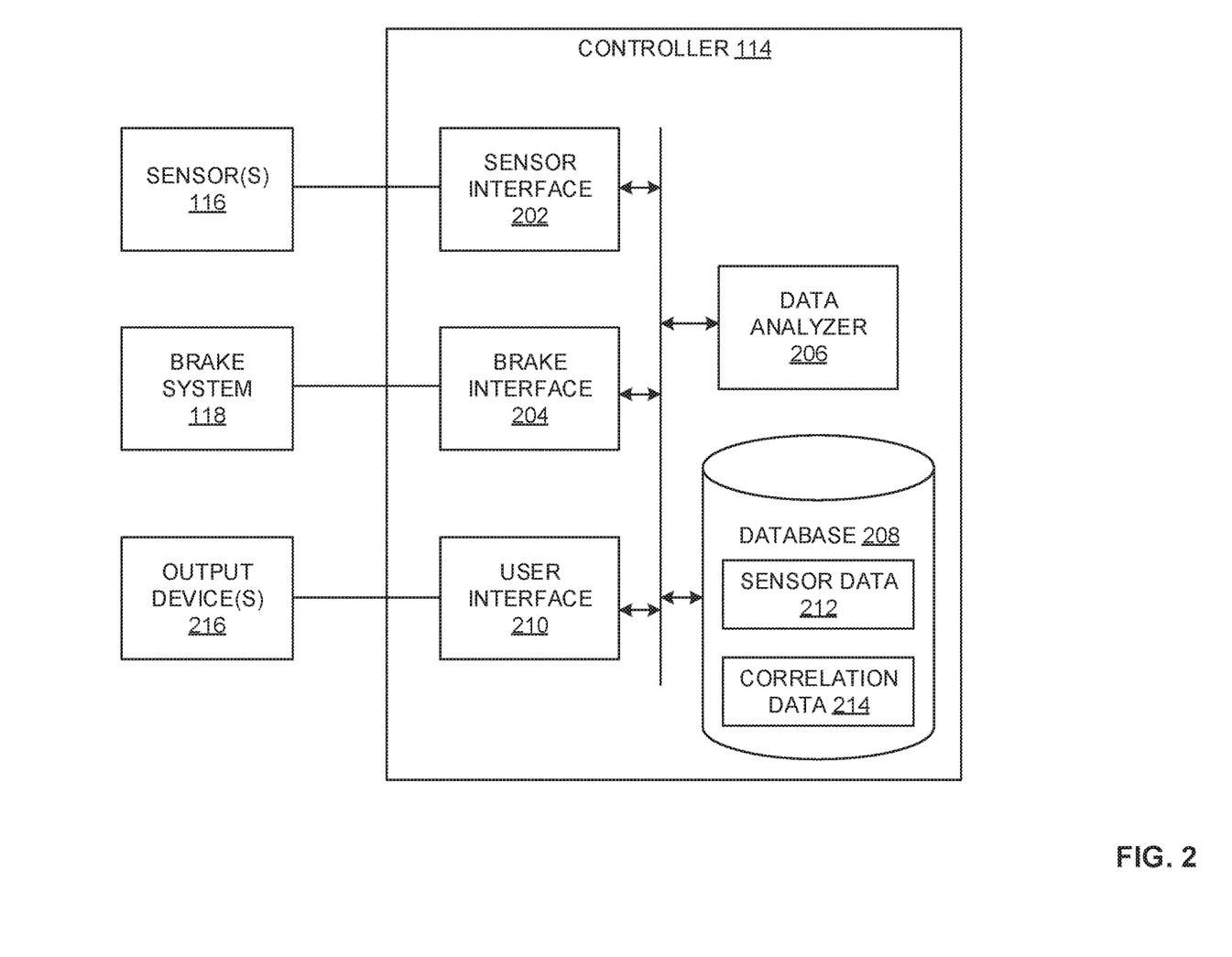
FIG. 2 is a block diagram of an example implementation of the example controller of FIG. 1.

FIG. 2 is a block diagram of an example implementation of the example controller 114 of FIG. 1. The controller 114 of FIG. 2 includes an example sensor interface 202, an example brake interface 204, an example data analyzer 206, an example database 208, and an example user interface 210. The example database 208 further includes example sensor data 212 and example correlation data 214. The illustrated example further includes the example sensors 116 of FIG. 1, the example brake system 118 of FIG. 1, and example output devices 216.

In operation, the sensor interface 202 is communicatively coupled to one or more sensors of a vehicle (e.g., the sensors 116 of the vehicle 102 of FIG. 1). For example, the sensor interface 202 receives data from one or more of the sensors 116 and transmits the data to the database 208 where it is stored. In some examples, the data is wheel speed or wheel angle data received from a single wheel sensor. In other examples, the data analyzer 206 receives data from each wheel (e.g., the wheels 106 of FIG. 1) of the vehicle 102 (e.g., four wheels of a car or truck). Additionally or alternatively, the data analyzer 206 can receive wheel angle data from greater or fewer than one wheel sensor. In some examples, the wheel sensor includes a tone wheel (e.g., a toothed wheel). In some such examples, the tone wheel includes a missing tooth to provide the absolute position of the wheel. In some other examples, the tone wheel does not include a missing tooth and provides relative position of the wheel.

The brake interface 204 is communicatively coupled to the brake system 118 of the vehicle 102. The brake interface 204 receives brake pressure data and/or other types of data from the brake system 118 and stores the received data in the database 208. In some examples, the brake system 118 includes a single brake pressure dataset (e.g., brake pressure of a master cylinder of the brake system 118). Additionally or alternatively, the brake system 118 can include two brake pressure sensors (e.g., one brake pressure sensor associated with the front wheels and one associated with the rear wheels) or four brake pressure sensors (e.g., one brake pressure sensor associated with each wheel 106 of the vehicle 102). The data received from the brake system 118 is further stored as the sensor data 212 in the database 208.

The data analyzer 206 retrieves the data (e.g., brake pressure data, wheel angle data, etc.) from the database 208 and uses the data to determine whether one of the rotors 108 of FIG. 1 is warped. In some examples, the data analyzer 206 correlates the brake pressure data from the brake system 118 with one or more parameters from the sensors 116 (e.g., wheel angle data from a wheel sensor, g-sensor data, etc.). For example, the data analyzer 206 correlates brake pressure data and wheel angle data for a braking event (e.g., braking applied during a 360° rotation of the vehicle wheels).

The data analyzer 206 of the illustrated example correlates the brake pressure data and the sensor data (e.g., wheel angle data). In some examples, the brake pressure data is plotted against wheel angle data, as shown in connection with FIGS. 5-7. For example, the brake pressure data and wheel angle data are measured at even increments of time, and the data analyzer 206 uses timestamps associated with each data point to combine the two data sets. The data analyzer 206 then plots the brake pressure data against the wheel angle data. Additionally or alternatively, the two datasets can be correlated using other data correlation methods. The correlated data created by the data analyzer 206 is stored in the database 208 as correlation data 214.

Using the correlation data 214, the data analyzer 206 determines a threshold brake pressure value. In some examples, the threshold brake pressure value is determined by first calculating an average pressure of the brake pressure dataset and setting the threshold at a particular value above the average. For example, the threshold value may be set at a value of 10% above the average. In other examples, the threshold value is set based on a different percentage or using a different method. In some examples, the brake pressure data is normalized before or after determining the threshold brake pressure value. The normalization of the brake pressure data is advantageous because detection of the warped rotor is not dependent on the magnitude of the brake pressure, but on the change (e.g., amplitude change) in the brake pressure. The magnitude of the brake pressure varies widely depending on the braking event. For example, the magnitude of a braking event in which a driver depresses the brake pedal only slightly will be much less than if the driver were to depress the brake pedal to the floor. By normalizing the brake pressure data, the magnitude of the brake pressure does not affect the results, and the pressure pulses present in the brake pressure data can be better analyzed.

In some examples, normalizing the brake pressure data includes calculating the average pressure of the brake pressure dataset and subtracting the average pressure from each data point in the brake pressure dataset. When the data is normalized, the average pressure becomes zero, and the change in magnitude (e.g., amplitude) can be compared between each normalized braking event (e.g., different braking events). For example, when a small magnitude braking event and large magnitude braking event are both normalized, the amplitudes of the brake pressure data are compared regardless of the level of deceleration. If a threshold value was set before normalization, as described above, the average value of the brake pressure data is subtracted from the calculated threshold value, thus normalizing the threshold for the brake pressure dataset. Additionally or alternatively, the threshold value can be set after the brake pressure dataset has been normalized. For example, the threshold value can be a predetermined value used for all normalized braking events. Examples disclosed herein in connection with FIGS. 2-7 describe using one or more maximum brake pressure values in the analysis of the brake pressure data. However, one or more minimum brake pressure values could also be used by the data analyzer 206. For example, a threshold could be set based on a value of 90% the average brake pressure, and the minimum brake pressure values could be compared to determine if the pressure values are below the threshold.

The data analyzer 206 of the illustrated example determines whether a rotor of the vehicle 102 (e.g., one of the rotors 108 of FIG. 1) is warped by comparing the brake pressure data of a braking event to the threshold value. For example, the normalized brake pressure data of the braking event either includes pressure pulses that meet the threshold value at or near one or more maximum brake pressure values of the pressure pulses or does not include any data points that meet the threshold value. When the pressure pulses do not include any data points that meet the threshold value, the data analyzer 206 continues to monitor the brake pressure data of subsequent braking events. On the other hand, if the brake pressure data meets the threshold value, the data analyzer 206 determines that a warped rotor is present in one or more of the wheel assemblies 104 of FIG. 1. In some examples, the data analyzer 206 outputs an alert to the driver of the vehicle via the user interface 210 and an output device 216. For example, the output device 216 displays an alert that notifies the driver that a warped rotor is present, and that servicing is required to resolve the issue. In some examples, the output device 216 is a display, a touchscreen display, an indicator (e.g., a light, sound, etc.), or other device.

In the illustrated example, the data analyzer 206 further identifies the wheel or wheels 106 of the vehicle 102 associated with the warped rotor(s). For example, the data analyzer 206 determines which of the wheel assemblies 104 includes the rotor 108 that is warped. To identify the wheel or wheels 106 associated with the warped rotor(s), the data analyzer 206 acquires data from the sensors 116 for each wheel 106 of the vehicle 102. For example, the data analyzer 206 receives wheel angle data from a wheel sensor of each wheel 106 of the vehicle 102. The data analyzer 206 uses the brake pressure data from the brake system 118 and correlates the brake pressure data with each set of data (e.g., corresponding to respective wheels) from the sensors 116. Accordingly, the data analyzer 206 creates four separate correlations, each of the correlations corresponding to a respective one of the wheels 106 of the vehicle 102. In some examples, one pressure sensor is included in the brake system 118, and the brake pressure data from the sensor is correlated separately with a set of data from the sensors 116 associated with each of the vehicle wheels 106. In some other examples, the brake system 118 includes two brake pressure sensors (e.g., one sensor for the front wheels and one for the rear wheels). In such examples, the brake pressure sensor associated with the front wheels is correlated with data from the sensors 116 associated with each of the front wheels (e.g., the front right and front left wheels) and the brake pressure sensor associated with the rear wheels is correlated separately with data from the sensors 116 associated with each of the rear wheels (e.g., the rear right and rear left wheels). In some examples, the brake system 118 includes four brake pressure sensors (e.g., one associated with each wheel of the vehicle) and the data from each brake pressure sensor is associated with sensor data of each respective wheel.

The data analyzer 206 stores the correlations associated with each wheel in the database 208 as the correlation data 214. The data analyzer 206 of the illustrated example obtains brake pressure data and sensor data (e.g., wheel angle data) for multiple braking events (e.g., two or more braking events) and correlates the data from each braking event as described above (e.g., creating a correlation for each wheel). For each braking event, the data analyzer 206 records the wheel angle associated with one or more maximum pressure values. For example, for a 360° braking event (e.g., one wheel rotation), the brake pressure data for a rotor exhibiting lateral runout will have two pressure pulses. Each of the two pressure pulses includes a maximum value, and the data analyzer 206 determines the wheel angles at which the maximum pressure values occur. The data analyzer 206 determines these wheel angles for each of the wheels of the vehicle 102 and stores the wheel angles in the correlation data 214 of the database 208.

In the illustrated example, the data analyzer 206 determines the wheel angles associated with the one or more maximum pressure values for each successive braking event and stores the results in the correlation data 214 of the database 208. The data analyzer 206 further compares successive braking events to determine whether the maximum pressure values of the successive braking events occur at the same angle. Such a comparison requires that the braking events each use the same total wheel angle (e.g., a 360° braking event, a 720° braking event, etc.). In some examples, the data analyzer 206 identifies a wheel or wheels (e.g., one or more of the wheels 106) as the wheel or wheels associated with the warped rotor(s) when the maximum pressure occurs at the same wheel angle within a threshold amount (e.g., within +/−2° of each other, within +/−5° of each other, etc.) in two or more successive braking events. For example, if the data analyzer 206 determines that, for the right front wheel, the maximum pressure values occur at wheel angles of 90° and 270° in a first braking event and 91° and 269° in a second braking event, the data analyzer 206 identifies the right front wheel as the wheel associated with the warped rotor. In other examples, the wheel angles between successive braking events must be exactly the same (e.g., 90° and 270° in both braking events) or may be allowed more variation (e.g., a second braking event is within 5° of a first braking event). In some examples, the data analyzer 206 requires that data from more than two braking events be analyzed (e.g., three or more braking events) before identifying one or more of the wheels 106 as the wheel or wheels associated with the warped rotor(s).

In some examples, the data analyzer 206 uses an auto-correlation computation to determine the greatest similarity between wheel angles of the one or more maximum brake pressure values (e.g., peaks of pressure pulsations) in successive braking events, thus identifying which wheel or wheels 106 of the vehicle 102 are associated with the warped rotor(s). In some examples, the data analyzer 206 normalizes correlation data 214 from successive braking events to a mean of zero (e.g., by subtracting the mean brake pressure value from each data point) and averages the normalized braking events. In such examples, the data analyzer 206 further compares an amplitude of a brake pressure oscillation of the averaged braking events (e.g., a peak-to-peak amplitude of an oscillation in the averaged braking event data plot) to a threshold value. When the amplitude of the brake pressure oscillation meets the threshold value, the data analyzer 206 determines that the wheel 106 corresponding to the data is associated with a warped rotor. An averaged braking event data plot satisfying the criteria (e.g., having an amplitude above the threshold) is shown in connection with FIG. 6. An averaged braking event data plot that does not satisfy the criteria, and thus is not associated with a warped rotor, is shown in connection with FIG. 7.

The data analyzer 206 bases the identification of the wheel or wheels associated with the warped rotor(s) on wheel angle because wheels of a vehicle 102 travel different distances during operation of the vehicle. For example, during a turn, the outside wheels of a vehicle travel further distances in the same amount of time, thus the rotational speed of the outside wheels is higher than the speed of the inside wheels (e.g., the outside wheels will complete a wheel rotation faster than the inside wheels). Accordingly, if the vehicle 102 makes a left turn, the right wheels (e.g., right front and right rear wheels) would travel a greater distance than the left wheels (e.g., left front and left rear wheels) in the same amount of time, resulting in a different temporal location of pressure pulses for a braking event (e.g., a 360° braking event) between left and right side wheels. In an alternative example, if the vehicle 102 makes a right turn, the left side wheels complete a 360° braking event in a shorter time than the right side wheels. Because the brake pressure data and wheel angle data are both collected based on time and combined using the timestamps of each dataset, the pressure pulses occur at different wheel angles for different wheels. Further, when the vehicle brakes, the rear wheels of the vehicle turn more than the front wheels because the front wheels exhibit more slip (e.g., because more of the braking effort is exerted on the front wheels). Thus, the front wheels rotate less than the rear wheels in the same amount of time. Using wheel angle correlated with brake pressure therefore allows the example methods disclosed herein to identify the correct wheel or wheels associated with the pressure pulses and the warped rotor(s).

The data analyzer 206 outputs information regarding the presence of one or more warped rotors and/or the wheel or wheels 106 associated with the one or more warped rotors to the user interface 210. The user interface 210 displays a message and/or alert to a driver of the vehicle 102 via one or more output devices 216. Such notification enables the driver to take the vehicle 102 to be serviced when a warped rotor is detected and before the warped rotor reduces driver comfort and/or vehicle performance. Further, identification of the wheel or wheels associated with the warped rotor(s) allows for easier and faster servicing because the rotor in need of repair has already been determined prior to servicing.

While an example manner of implementing the controller 114 of FIG. 1 is illustrated in FIG. 2, one or more of the elements, processes and/or devices illustrated in FIG. 2 may be combined, divided, re-arranged, omitted, eliminated and/or implemented in any other way. Further, the example sensor interface 202, the example brake interface 204, the example data analyzer 206, the example user interface 210, and/or, more generally, the example controller 114 of FIG. 1 may be implemented by hardware, software, firmware and/or any combination of hardware, software and/or firmware. Thus, for example, any of the example sensor interface 202, the example brake interface 204, the example data analyzer 206, the example user interface 210, and/or, more generally, the example controller 114 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example sensor interface 202, the example brake interface 204, the example data analyzer 206, the example user interface 210, and/or the example controller 114 is/are hereby expressly defined to include a non-transitory computer readable storage device or storage disk such as a memory, a digital versatile disk (DVD), a compact disk (CD), a Blu-ray disk, etc. including the software and/or firmware. Further still, the example controller of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
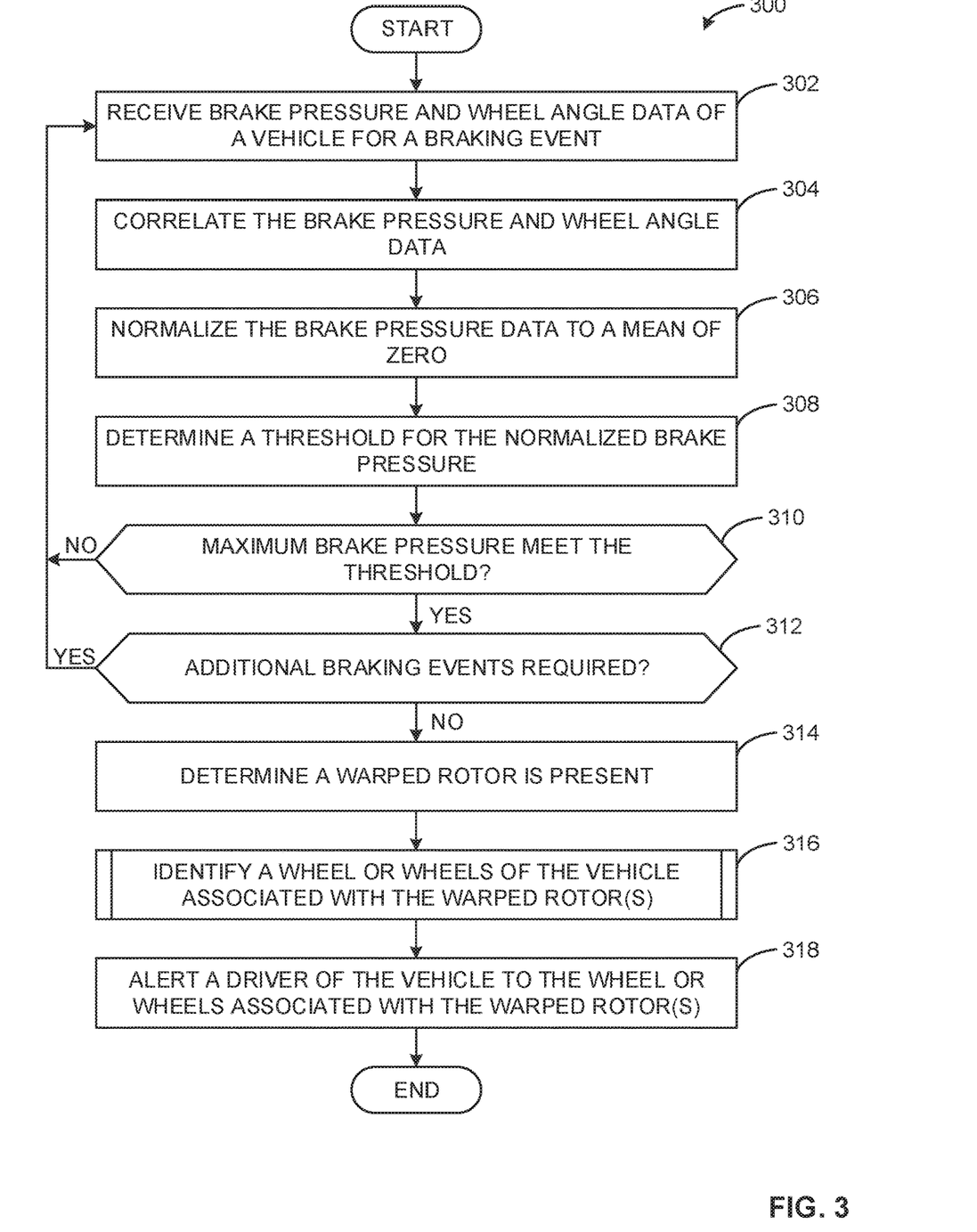
FIG. 3 is a flowchart representative of machine readable instructions that may be executed to implement the example controller of FIGS. 1-2 to alert a driver to a warped rotor.
Figure 4:
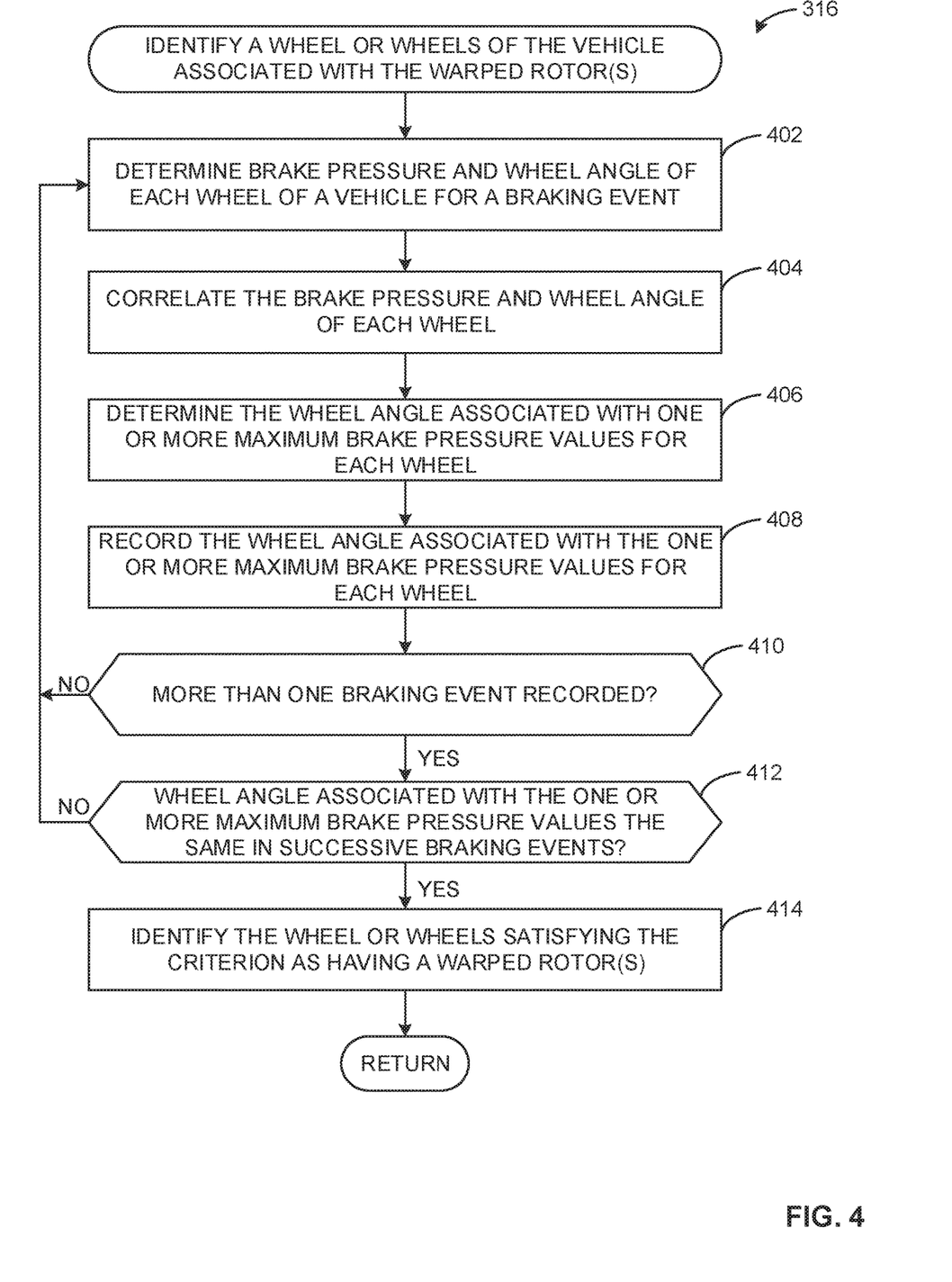
FIG. 4 is a flowchart representative of machine readable instructions that may be executed to implement the example controller of FIGS. 1-2 to identify a wheel or wheels of a vehicle associated with a warped rotor(s).

Flowcharts representative of example hardware logic, machine readable instructions, hardware implemented state machines, and/or any combination thereof for implementing the controller 114 of FIG. 1 are shown in FIGS. 3-4. The machine readable instructions may be an executable program or portion of an executable program for execution by a computer processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIGS. 3-4, many other methods of implementing the example controller 114 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 3-4 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

FIG. 3 is a flowchart representative of machine readable instructions that may be executed to implement the example controller 114 of FIGS. 1-2 to alert a driver to a warped rotor. The example program 300 begins at block 302 where the example controller 114 receives brake pressure and wheel angle data of a vehicle (e.g., the vehicle 102 of FIG. 1) for a braking event. For example, the controller 114 receives the brake pressure data from the example brake system 118 of FIG. 1 and receives wheel angle data from an example wheel sensor (e.g., the example sensor 116 of FIG. 1). In some examples, the controller stores the brake pressure and wheel angle data as sensor data 212 in the example database 208 of FIG. 2.

At block 304, the example controller 114 correlates the brake pressure and wheel angle data. For example, the data analyzer 206 of FIG. 2 correlates the received brake pressure data and the wheel angle data by plotting the brake pressure data against the wheel angle data. In some examples, the timestamps of each received dataset (e.g., brake pressure data and wheel angle data) are used to resample the two datasets for the correlation.

At block 306, the example controller 114 normalizes the brake pressure data to a mean of zero. For example, the data analyzer 206 calculates an average of the brake pressure data and subtracts the average value from each data point of the brake pressure dataset to normalize the brake pressure data. The brake pressure data is normalized to compare the pressure data to subsequent brake pressure datasets based on an increase in pressure during the pulsations (e.g., instead of a magnitude of the pressure values).

At block 308, the example controller 114 determines a threshold for the normalized brake pressure. For example, the data analyzer 206 of FIG. 2 determines a threshold value based on an average brake pressure of the pressure values prior to normalization and/or historical brake pressure data. In some examples, the data analyzer 206 determines a threshold value as a percentage (e.g., 10%) above the average brake pressure prior to normalization and uses that value (e.g., 10% above the average minus the average prior to normalization) to set a pressure threshold. In some alternative examples, the threshold value is set as a predetermined value (e.g., set by a user, manufacturer, etc.). Blocks 306 and 308 may be executed in the order shown in FIG. 3 or may be reversed (e.g., executing block 308 and then block 306) without changing the performance of program 300.

At block 310, the example controller 114 determines whether a maximum brake pressure meets the threshold. For example, the data analyzer 206 determines one or more maximum pressure values and compares them to the threshold set by the data analyzer 206. In some examples, the brake pressure received by the controller 114 from the brake system of FIGS. 1-2 includes pressure pulses (e.g., having a maximum and a minimum). When the data analyzer 206 determines that the one or more maximum pressure values of the brake pressure data meet the threshold, control of program 300 proceeds to block 312. On the other hand, if the one or more maximum pressure values do not meet the threshold determined by the data analyzer 206, control of the program 300 returns to block 302 where new brake pressure and wheel angle data of the vehicle are received corresponding to a new braking event. In some alternative examples, the data analyzer 206 determines that a peak-to-peak amplitude of the brake pressure data meets a threshold value. For example, the data analyzer 206 subtracts a minimum value from a maximum value to determine a range of data (e.g., a peak-to-peak amplitude) and compares the range to a threshold to determine whether a warped rotor is present (e.g., if the range meets the threshold value).

At block 312, the example controller 114 determines whether additional braking events are required. For example, the data analyzer 206 determines whether additional wheel angle data is to be received from a sensor 116 (e.g., a wheel sensor) and/or brake pressure data is to be received from the brake system 118 for one or more new braking events. In some examples, additional data is received to verify the results of a previous correlation of a braking event. In some examples, the data analyzer 206 determines that a correlation is to be created for a predetermined number of braking events. Thus, at block 312 the program 300 ensures that the predetermined number of braking events are analyzed prior to proceeding to block 314.

At block 314, the controller 114 determines that a warped rotor is present. For example, the data analyzer 206 determines that when the maximum brake pressure meets the threshold determined at block 308, one of the example rotors 108 of FIG. 1 is a warped rotor that must be repaired and/or replaced. In some examples, the data analyzer 206 only determines that a warped rotor is present after the one or more maximum pressure values of multiple (e.g., two or more) braking events meet the threshold.

At block 316, the controller 114 further identifies a wheel or wheels of the vehicle associated with the warped rotor(s). For example, the data analyzer 206 uses the wheel angle data and the brake pressure data to determine the position of the wheel or wheels 106 having the warped rotor(s) (e.g., a right front wheel, left back wheel, etc.). The process of block 316 is described in further detail in connection with FIG. 4.

The program 300 further alerts a driver of the vehicle to the wheel or wheels associated with the warped rotor(s) (block 318). For example, the data analyzer 206 communicates with the user interface 210 when the wheel or wheels 106 associated with the warped rotor(s) have been identified. The user interface 210 displays the alert to the driver via the output device 216 of FIG. 2 (e.g., a display, a touchscreen, an indicator light, etc.). The alert indicates to the driver that the one or more warped rotor(s) (e.g., one or more of the rotors 108 of FIG. 1) is in need of servicing and/or maintenance.

FIG. 4 is a flowchart representative of machine readable instructions that may be executed to implement the example controller of FIGS. 1-2 to identify a wheel or wheels of a vehicle associated with a warped rotor(s). The example program 316 begins at block 402 where the controller 114 determines brake pressure and wheel angle of each wheel (e.g., the wheel 106 of FIG. 1) of a vehicle (e.g., the vehicle 102 of FIG. 1) for a braking event. For example, the data analyzer 206 determines a brake pressure (e.g., from the brake system 118) and a wheel angle (e.g., from the sensor 116 (e.g., a wheel sensor) of FIG. 1) and associates the wheel angle with a respective wheel 106 of the vehicle 102. In some examples, the data analyzer 206 receives two brake pressure data sets (e.g., one data set for the front wheels and one data set for the rear wheels) and correlates each data set to its respective wheels. For example, brake pressure data of the front wheels is correlated with each of the front wheels, while brake pressure data of the rear wheels is correlated with each of the rear wheels. In some alternative examples, the data analyzer 206 receives one brake pressure data set and correlates it to each of the four wheel angle data inputs.

At block 404, the controller 114 correlates the brake pressure and wheel angle of each wheel. For example, the data analyzer 206 correlates the brake pressure data with the wheel angle by matching the timestamps of each data input. In some examples, the brake pressure data is sampled at even increments of wheel angle (e.g., 6°) for each wheel 106 of the vehicle 102. In some examples, the data analyzer 206 maintains four sets of correlation data for (e.g., represented by four separate data plots), each corresponding to a respective wheel 106 of the vehicle 102.

At block 406, the controller 114 determines the wheel angle associated with one or more maximum brake pressure values for each wheel. For example, the data analyzer 206 determines one or more maximum brake pressure values (e.g., a maximum brake pressure of each pressure pulse) and records the wheel angle at which the maximum brake pressure occurs. The controller 114 further records the angle associated with the one or more maximum brake pressure values for each wheel (block 408). For example, if two brake pressure pulses occur at 90° and 270° for a 360° braking event, the data analyzer 206 records the angles (e.g., as correlation data 214 of the database 208 of FIG. 2). The data analyzer 206 further determines the wheel angle of one or more maximum brake pressure values of each of the wheels 106 of the vehicle 102.

At block 410, the controller 114 determines whether more than one braking event was recorded. For example, the data analyzer 206 requires data (e.g., brake pressure data and wheel angle data for each wheel 106) from more than one braking event be collected and analyzed. In some examples, data from braking events occurring after a first braking event are needed to verify the results of the first braking event. In some examples, identifying one or more wheels 106 as the wheel or wheels associated with the warped rotor(s) requires data from multiple braking events (e.g., to enable a comparison between the two braking events). For example, a braking event occurring while the vehicle 102 is traveling straight will not allow for identification of a single wheel 106 because the left and right wheels 106 travel a same distance in a same amount of time. Therefore, the pressure pulses associated with the front right and front left wheels 106 can have maximum pressure points (e.g., the peak of the pulsation) at the same wheel angles. However, if a subsequent braking event analyzed by the data analyzer 206 occurs when the vehicle 102 turns, the data analyzer 206 can determine the wheel or wheels 106 associated with the warped rotor(s) because the left and right wheels 106 (e.g., the front right and front left wheels and/or back right and back left wheels) travel different distances in an equal amount of time (e.g., an outside wheel will rotate faster than an inside wheel). If more than one braking event is recorded, control of program 316 proceeds to block 412. However, control of program 316 returns to block 402 if only one braking event has been recorded.

At block 412, the controller 114 determines whether the wheel angle associated with the one or more maximum brake pressure values is the same in successive braking events. For example, the data analyzer 206 determines the wheel angle associated with one or more maximum pressure values for each wheel 106 in successive braking events and stores the results as correlation data 214 in the example database 208. The data analyzer 206 further determines whether one or more of the wheels exhibits one or more maximum pressure values at the same wheel angle in the successive braking event or events. In some examples, the data analyzer 206 determines that more than one wheel (e.g., both the front wheels) exhibit one or more maximum pressure values at the same wheel angle in successive braking events. When the wheel angle associated with the one or more maximum brake pressure values is the same in successive braking events, control proceeds to block 414, while differing wheel angles associated with maximum pressure values in successive braking events causes control of program 316 to return to block 402.

At block 414, the controller 114 identifies the wheel or wheels satisfying the criterion of block 412 as the wheel or wheels having the warped rotor(s). For example, the data analyzer 206 uses the wheel angle data from the sensor 116 (e.g., a wheel sensor) and brake pressure data from the brake system 118 to identify the wheel or wheels associated with the warped rotor(s) throughout blocks 402 to 412. In some examples, more than one wheel (e.g., both the front wheels) satisfies the criterion, indicating that multiple wheels include a warped rotor. When the wheel or wheels having the warped rotor(s) have been identified, control returns to block 318 of FIG. 3, and the program 316 of FIG. 4 concludes.

In an alternative example, the program 316 executes different and/or modified steps to identify the wheel or wheels 106 of the vehicle 102 associated with the warped rotor(s). In such an example, the program 316 does not execute block 406, block 408 (e.g., the program 316 proceeds from block 404 to block 410), or block 412. When more than one braking event has been recorded (e.g., at block 410), the program 316 executes instructions causing the controller 114 to normalize the data associated with the braking events (e.g., by subtracting each data point by the mean brake pressure value). The program 316 further causes the controller 114 to average the normalized braking events and determine an amplitude of a brake pressure oscillation for the data set. The amplitude of brake pressure oscillation is further compared to a threshold value to determine whether a warped rotor is present. When the amplitude of the brake pressure oscillation meets the threshold value, the program 316 proceeds to block 414. If, on the other hand, the amplitude of the brake pressure oscillation is less than the threshold value, the program 316 returns to block 402.

In some further examples, the program 300 provides prognostic information (e.g., when a rotor is expected to become warped) in addition to diagnostic information (e.g., whether or not a warped rotor is present). For example, the program 300 may determine that pulsations in brake pressure data corresponding to one of the wheels 106 of vehicle 102 have increased in amplitude over a given amount of time and/or distance (e.g., an increase from 1 kPa to 2 kPa over 20,000 miles). In such an example, the data analyzer 206 estimates when the brake rotor 108 corresponding to the wheel 106 is likely to become warped (e.g., after an additional 30,000 miles, etc.).

Figure 5:
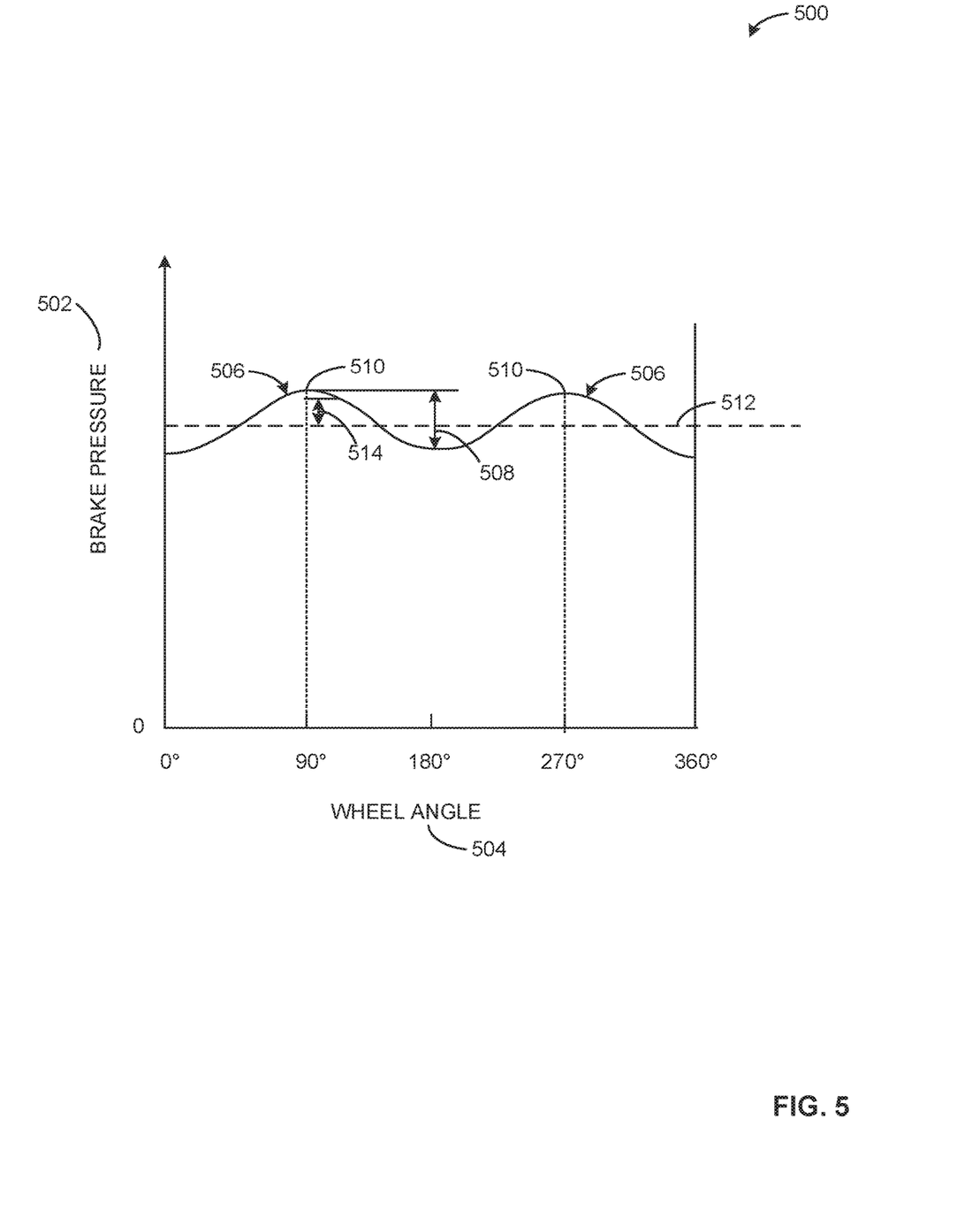
FIG. 5 is an example brake event plot representative of correlation data used to determine a presence of a warped rotor.

FIG. 5 is an example brake event plot 500 representative of correlation data used to determine a presence of a warped rotor. The example brake event plot 500 includes brake pressure data 502 and wheel angle data 504 for a 360° braking event. In other examples, the brake event plot 500 includes data for a longer or shorter braking event (e.g., a 180° braking event, a 720° braking event, etc.). The brake pressure data 502 is plotted against the wheel angle data 504 for each wheel (e.g., the wheel 106 of FIG. 1) of a vehicle (e.g., the vehicle 102 of FIG. 1). The brake event plot 500 indicates that the brake pressure data 502 is associated with a warped rotor by pressure pulses 506 in the brake pressure data 502. The pressure pulses 506 of the brake pressure data 502 have an amplitude 508 measured between minimum and maximum brake pressure values. The maximum brake pressure values 510 of the brake pressure data 502 correspond to wheel angles of the wheel angle data 504. The brake event plot 500 of FIG. 5 specifies two wheel angles corresponding to maximum brake pressure values 510 of the brake pressure data 502. For example, in FIG. 5, the maximum brake pressure values 510 occur at wheel angles of 90° and 270°. In some other examples, the plot 500 includes maximum brake pressure values 510 that occur at other wheel angles and/or includes greater or fewer pressure pulses 506. The wheel angles 504 of the maximum brake pressure values 510 are recorded by the data analyzer 206 of FIG. 2 for each braking event.

The brake event plot 500 includes an average brake pressure 512 calculated by the example data analyzer 206 using all of the brake pressure data points of the brake pressure data 502. In some examples, the average pressure 512 is used by the data analyzer 206 to determine a threshold brake pressure 514 (e.g., the threshold is determined to be 10% above the average pressure 512). In some examples, the amplitude 508 of the brake pressure data 502 meets the threshold brake pressure 514. When the amplitude 508 meets the threshold brake pressure 514, the data analyzer 206 determines that a warped rotor is present in one of the wheels 106 of the vehicle 102 of FIG. 1.

Figure 6:
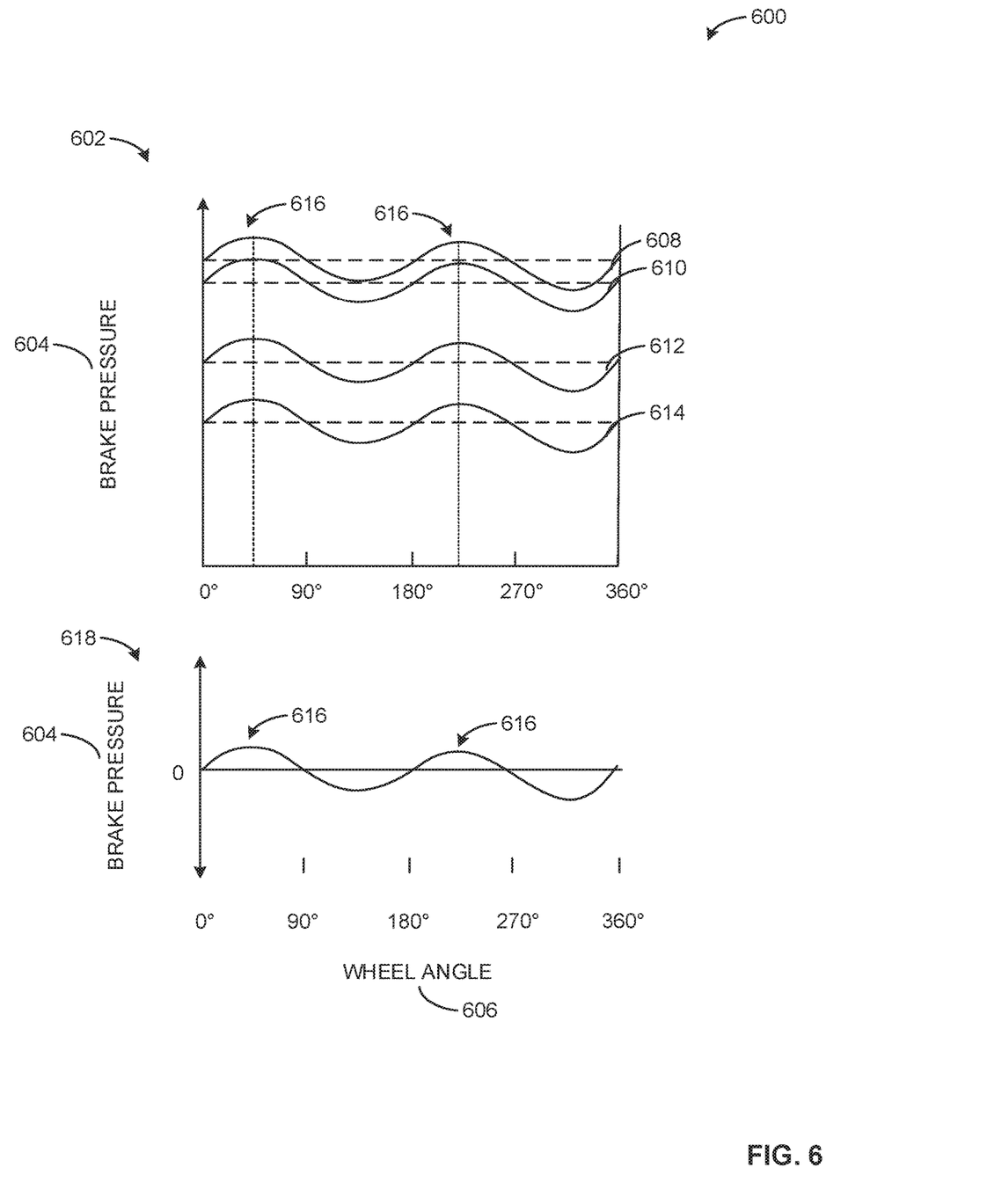
FIG. 6 is an example warped rotor data plot representative of correlation data for a wheel having a warped rotor.

FIG. 6 is an example warped rotor data plot 600 representative of correlation data for a wheel having a warped rotor. The warped rotor data plot 600 includes an example warped rotor braking event plot 602 having brake pressure data 604 plotted against wheel angle data 606 for four braking events. The brake pressure data 604 includes data from a first warped rotor braking event 608, a second warped rotor braking event 610, a third warped rotor braking event 612, and a fourth warped rotor braking event 614. The brake pressure data 604 of each of the four warped rotor braking events 608-614 includes pressure pulses 616 at wheel angles 606 of approximately 45° and 225°. In the brake event plot 602, the pressure pulses of each warped rotor braking event 608-614 occur at approximately the same wheel angle 606 (e.g., within a threshold angle (e.g., +/−2°) of each other). The data analyzer 206 of FIG. 2 records these wheel angles 606 and uses them to determine that the wheel (e.g., the wheel 106 of FIG. 1) associated with the data of FIG. 6 is the wheel associated with the warped rotor.

The warped rotor data plot 600 further includes a normalized warped rotor braking event plot 618 created by the data analyzer 206. The data analyzer 206 normalizes the brake pressure data 604 of each of the warped rotor braking events 608-614 and averages the four warped rotor braking events to create the normalized plot 618 of FIG. 6. When the warped rotor braking events 608-614 are normalized and averaged, the normalized warped rotor braking event plot 618 includes pressure pulses 616 that occur at 45° and 225°. It is not required that the normalized warped rotor braking event plot 618 be created by the data analyzer 206 to identify the wheel associated with the warped rotor. However, the normalized warped rotor braking event plot 618 provides a visual representation of how the four warped rotor braking events 608-614 are substantially aligned (e.g., the pressure pulses 616 occur at approximately the same wheel angle 606) for a wheel associated with the warped rotor.

Figure 7:
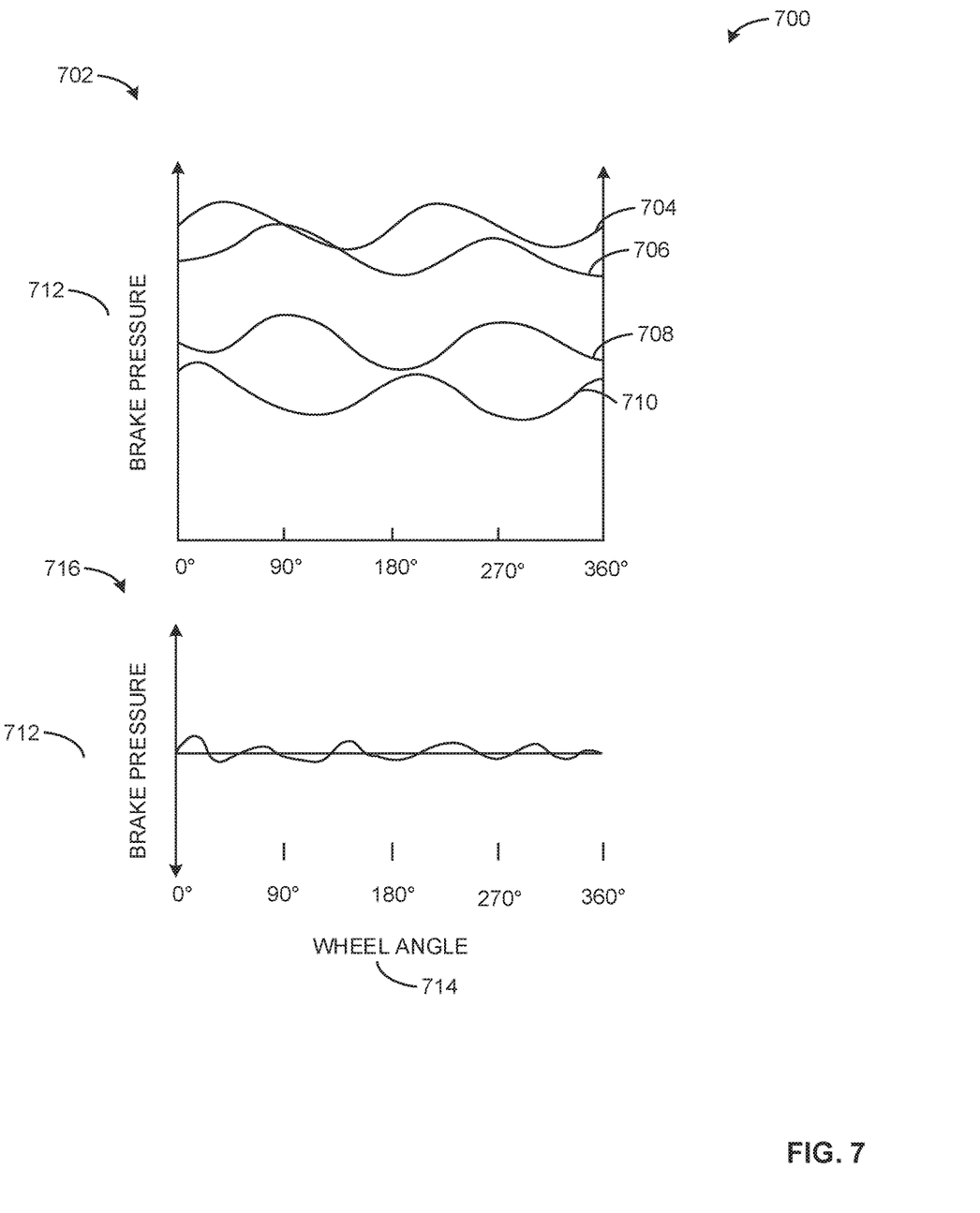
FIG. 7 is an example non-warped rotor data plot representative of correlation data for a wheel that does not have a warped rotor.

FIG. 7 is an example non-warped rotor data plot 700 representative of correlation data for a wheel that does not have a warped rotor. The non-warped rotor data plot 700 includes a non-warped rotor braking event plot 702 that includes four braking events related to a single wheel (e.g., one of the wheels 106 of FIG. 1): a first non-warped rotor braking event 704, a second non-warped rotor braking event 706, a third non-warped rotor braking event 708, and a fourth non-warped rotor braking event 710. For each of the four non-warped rotor braking events 704-710, the non-warped rotor braking event plot 702 plots brake pressure data 712 against wheel angle data 714 of the wheel. The data analyzer 206 can then determine that the pressure pulses of the non-warped rotor braking events 704-710 are not substantially aligned based on the angles at which maximum brake pressure values occur.

The data analyzer 206 can further normalize and average the brake pressure data 712 of the four non-warped rotor braking events 704-710 to produce a normalized non-warped rotor data plot 716. For example, the brake pressure data 712 of each the non-warped rotor braking events 704-710 are normalized by the data analyzer 206 (e.g., by subtracting an average of the brake pressure data for each braking event from all data points associated with the brake pressure data 712). The normalized non-warped rotor data plot 716 shows that the brake pressure data 712 of the four non-warped rotor braking events 704-712 does not include pressure pulses that occur at the same wheel angle 714, unlike the pressure pulses shown in FIG. 6. Thus, the data analyzer 206 determines that the brake pressure data 712 and wheel angle data 714 of FIG. 7 are associated with a wheel that does not have a warped rotor. In some examples, the non-warped rotor braking event plot 702 does not need to be normalized and averaged (e.g., to create the non-warped rotor braking event plot 716) to determine whether a wheel is associated with a warped rotor. In some examples, the data analyzer 206 uses more or less braking events than the four non-warped rotor braking events 704-710.

Figure 8:
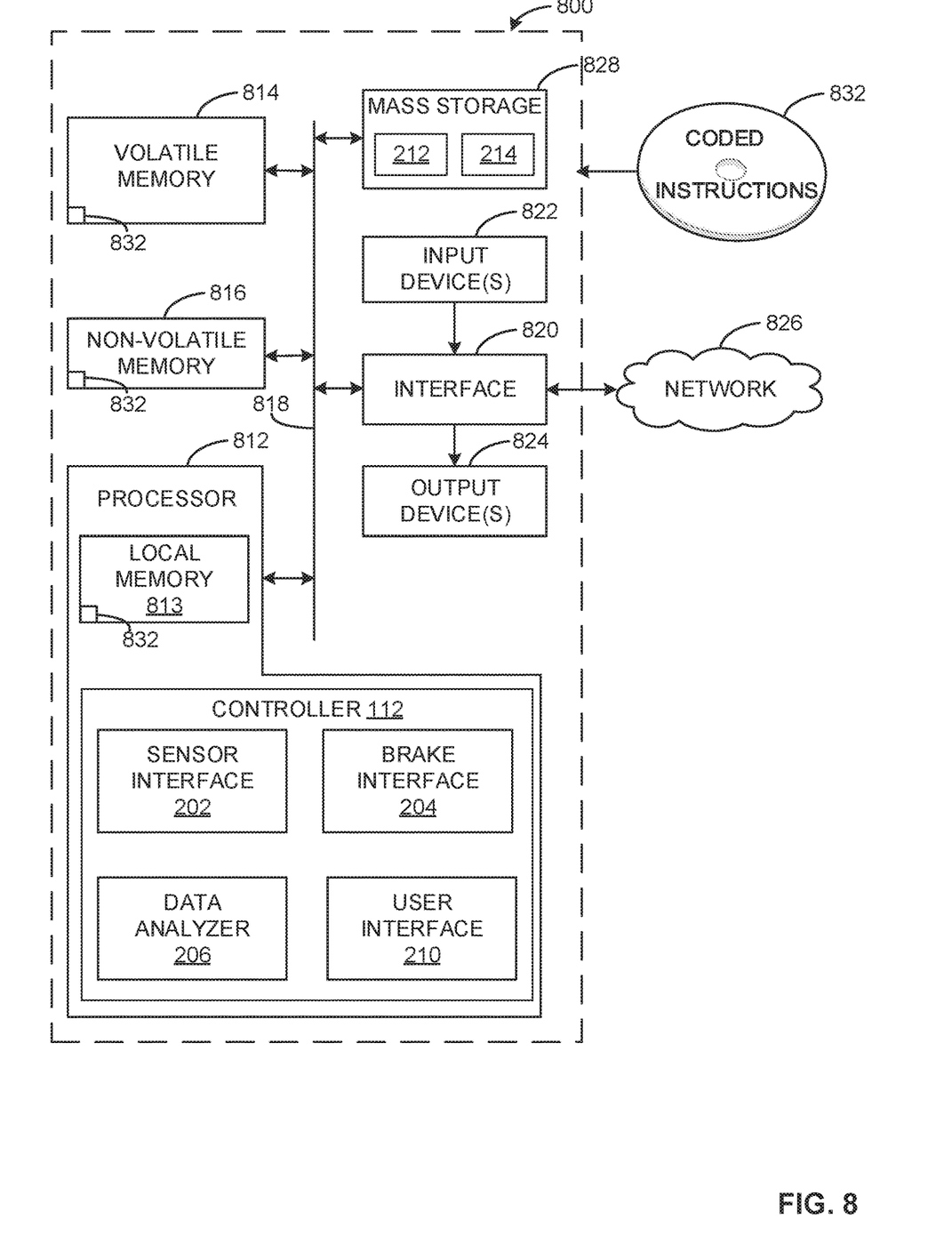
FIG. 8 is a block diagram of an example processing platform structured to execute the instructions of FIGS. 3-4 to implement the example controller of FIGS. 1-2.

FIG. 8 is a block diagram of an example processor platform 800 structured to execute the instructions of FIGS. 3-4 to implement the controller 114 of FIGS. 1-2. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example sensor interface 202, the example brake interface 204, the example data analyzer 206, and the example user interface 210.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIGS. 3-4 may be stored in the mass storage device 828, in the volatile memory 814, in the non-volatile memory 816, and/or on a removable non-transitory computer readable storage medium such as a CD or DVD.

Example 1 includes an apparatus comprising a controller configured to receive a brake pressure and one or more wheel parameters of a vehicle associated with a first braking event, determine a presence of a warped rotor based on a comparison of the brake pressure to a threshold pressure, and identify a wheel of the vehicle associated with the warped rotor based on the brake pressure and the one or more wheel parameters.

Example 2 includes the apparatus of example 1, wherein the controller determines the threshold pressure based on an average pressure of the first braking event.

Example 3 includes the apparatus of example 1, wherein the controller is further configured to send an alert to a driver of the vehicle identifying the wheel of the vehicle associated with the warped rotor.

Example 4 includes the apparatus of example 1, wherein the one or more wheel parameters of the vehicle includes wheel angle.

Example 5 includes the apparatus of example 4, wherein the controller identifies the wheel of the vehicle associated with the warped rotor by receiving brake pressure and wheel angle data for each wheel of the vehicle associated with one or more subsequent braking events correlating the brake pressure with the wheel angle of each wheel for each of the one or more subsequent braking events, and associating the wheel having a maximum pressure occurring at a same wheel angle as the first braking event in the one or more subsequent braking events with the warped rotor.

Example 6 includes the apparatus of example 5, wherein the controller correlates the brake pressure and the wheel angle based on timestamps associated with the brake pressure and the wheel angle.

Example 7 includes the apparatus of example 5, wherein at least one of the one or more subsequent braking events occurs when the vehicle is in a turn.

Example 8 includes a tangible computer readable storage medium comprising instructions that, when executed, cause a machine to at least receive a brake pressure and one or more wheel parameters of a vehicle associated with a first braking event, determine a presence of a warped rotor based on a comparison of the brake pressure to a threshold pressure, and identify a wheel of the vehicle associated with the warped rotor based on the brake pressure and the one or more wheel parameters.

Example 9 includes the tangible computer readable storage medium of example 8, wherein the threshold pressure is based on an average pressure of the first braking event.

Example 10 includes the tangible computer readable storage medium of example 8, wherein the instructions further cause the machine to send an alert to a driver of the vehicle identifying the wheel of the vehicle associated with the warped rotor.

Example 11 includes the tangible computer readable storage medium of example 8, wherein the one or more wheel parameters of the vehicle includes wheel angle.

Example 12 includes the tangible computer readable storage medium of example 11, wherein the instructions, when executed, cause the machine to identify the wheel of the vehicle associated with the warped rotor by receiving brake pressure and wheel angle data for each wheel of the vehicle associated with one or more subsequent braking events correlating the brake pressure with the wheel angle of each wheel for each of the one or more subsequent braking events, and associating the wheel having a maximum pressure occurring at a same wheel angle as the first braking event in the one or more subsequent braking events with the warped rotor.

Example 13 includes the tangible computer readable storage medium of example 12, wherein the brake pressure and the wheel angle are correlated based on timestamps associated with the brake pressure and wheel angle.

Example 14 includes the tangible computer readable storage medium of example 12, wherein at least one of the one or more subsequent braking events occurs when the vehicle is in a turn.

Example 15 includes a method comprising receiving a brake pressure and one or more wheel parameters of a vehicle associated with a first braking event, determining a presence of a warped rotor based on a comparison of the brake pressure to a threshold pressure, and identifying a wheel of the vehicle associated with the warped rotor based on the brake pressure and the one or more wheel parameters.

Example 16 includes the method of example 15, wherein the threshold pressure is determined based on an average pressure of the first braking event.

Example 17 includes the method of example 15, further including sending an alert to a driver of the vehicle identifying the wheel of the vehicle associated with the warped rotor.

Example 18 includes the method of example 15, wherein the one or more wheel parameters of the vehicle includes wheel angle.

Example 19 includes the method of example 18, wherein identifying the wheel of the vehicle associated with the warped rotor includes receiving brake pressure and wheel angle data for each wheel of the vehicle associated with one or more subsequent braking events, correlating the brake pressure with the wheel angle of each wheel for each of the one or more subsequent braking events, and associating the wheel having a maximum pressure occurring at a same wheel angle as the first braking event in the one or more subsequent braking events with the warped rotor.

Example 20 includes the method of example 19, wherein the brake pressure and the wheel angle are correlated based on timestamps associated with the brake pressure and the wheel angle.

From the foregoing, it will be appreciated that example methods and apparatus have been disclosed that detect warped rotors based on brake pressure (e.g., from a braking system of a vehicle). In some examples, a controller determines a presence of a warped rotor and alerts a driver of the vehicle, an OEM, and/or a fleet owner to the presence of the warped rotor. Some further examples include identifying a wheel or wheels associated with the warped rotor(s) (e.g., a right front wheel, a left rear wheel, etc.) and alerting the driver, OEM, and/or fleet manager to the wheel or wheels associated with the warped rotor(s). By determining the presence of the warped rotor(s) and identifying the specific wheel or wheels associated with the warped rotor, the warped rotor can be repaired before further problems develop. Such examples lead to improved driver comfort because the warped rotor(s) can cause pressure pulses felt in the brake pedal and steering wheel. Further, the examples disclosed herein reduce the possibility of poor brake performance due to warped rotors.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a controller configured to:
receive a brake pressure and a wheel angle of a vehicle associated with a first braking event;
determine a presence of a warped rotor based on a comparison of the brake pressure to a threshold pressure; and
identify a wheel of the vehicle associated with the warped rotor based on the brake pressure and the wheel angle by:
receiving, for each wheel of a vehicle, brake pressure and wheel angle data associated with one or more subsequent braking events;
correlating the brake pressure with the wheel angle of each wheel for each of the one or more subsequent braking events; and
associating the wheel having a maximum pressure occurring at a same wheel angle as the first braking event in the one or more subsequent braking events with the warped rotor.

2. The apparatus of claim 1, wherein the controller determines the threshold pressure based on an average pressure of the first braking event.

3. The apparatus of claim 1, wherein the controller is further configured to send an alert to a driver of the vehicle identifying the wheel of the vehicle associated with the warped rotor.

4. The apparatus of claim 1, wherein the controller correlates the brake pressure and the wheel angle based on timestamps associated with the brake pressure and the wheel angle.

5. The apparatus of claim 1, wherein at least one of the one or more subsequent braking events occurs when the vehicle is in a turn.

6. A tangible computer readable storage medium comprising instructions that, when executed, cause a machine to at least:

receive a brake pressure and a wheel angle of a vehicle associated with a first braking event;

determine a presence of a warped rotor based on a comparison of the brake pressure to a threshold pressure; and identify a wheel of the vehicle associated with the warped rotor based on the brake pressure and the wheel angle by:

receiving, for each wheel of a vehicle, brake pressure and wheel angle data associated with one or more subsequent braking events;

correlating the brake pressure with the wheel angle of each wheel for each of the one or more subsequent braking events; and     associating the wheel having a maximum pressure occurring at a same wheel angle as the first braking event in the one or more subsequent braking events with the warped rotor.

7. The tangible computer readable storage medium of claim 6, wherein the threshold pressure is based on an average pressure of the first braking event.

8. The tangible computer readable storage medium of claim 6, wherein the instructions further cause the machine to send an alert to a driver of the vehicle identifying the wheel of the vehicle associated with the warped rotor.

9. The tangible computer readable storage medium of claim 6, wherein the brake pressure and the wheel angle are correlated based on timestamps associated with the brake pressure and wheel angle.

10. The tangible computer readable storage medium of claim 6, wherein at least one of the one or more subsequent braking events occurs when the vehicle is in a turn.

11. A method comprising:

receiving a brake pressure and a wheel angle of a vehicle associated with a first braking event;

determining a presence of a warped rotor based on a comparison of the brake pressure to a threshold pressure; and identifying a wheel of the vehicle associated with the warped rotor based on the brake pressure and the wheel angle by:

receiving, for each wheel of a vehicle, brake pressure and wheel angle data associated with one or more subsequent braking events;

correlating the brake pressure with the wheel angle of each wheel for each of the one or more subsequent braking events; and     associating the wheel having a maximum pressure occurring at a same wheel angle as the first braking event in the one or more subsequent braking events with the warped rotor.

12. The method of claim 11, wherein the threshold pressure is determined based on an average pressure of the first braking event.

13. The method of claim 11, further including sending an alert to a driver of the vehicle identifying the wheel of the vehicle associated with the warped rotor.

14. The method of claim 11, wherein the brake pressure and the wheel angle are correlated based on timestamps associated with the brake pressure and the wheel angle.

* * * * *